2 Sheets—Sheet 1.

J. P. EDDLEMAN.
COMBINED SOWER, PLANTER, CULTIVATOR, SCRAPER, AND GANG PLOW

No. 103,855.  Patented June 7, 1870.

Witnesses:
A. W. Almquist
Edgar Tate

Inventor:
J. P. Eddleman
per Munn
Attorneys.

J. P. EDDLEMAN.
COMBINED SOWER, PLANTER, CULTIVATOR, SCRAPER, AND GANG PLOW.
No. 103,855. Patented June 7, 1870.

UNITED STATES PATENT OFFICE.

JAMES P. EDDLEMAN, OF PILOT POINT, TEXAS.

IMPROVEMENT IN COMBINED SOWER, PLANTER, CULTIVATOR, SCRAPER, AND GANG-PLOW.

Specification forming part of Letters Patent No. 103,855, dated June 7, 1870.

*To all whom it may concern:*

Be it known that I, JAMES P. EDDLEMAN, of Pilot Point, in the county of Denton and State of Texas, have invented a new and useful Improvement in Combined Sower, Planter, Cultivator, Scraper, and Gang-Plow; and I do hereby declare that the following is a full, clear, and exact description thereof, which will enable others skilled in the art to make and use the same, reference being had to the accompanying drawings, forming part of this specification, in which—

Figure 1:
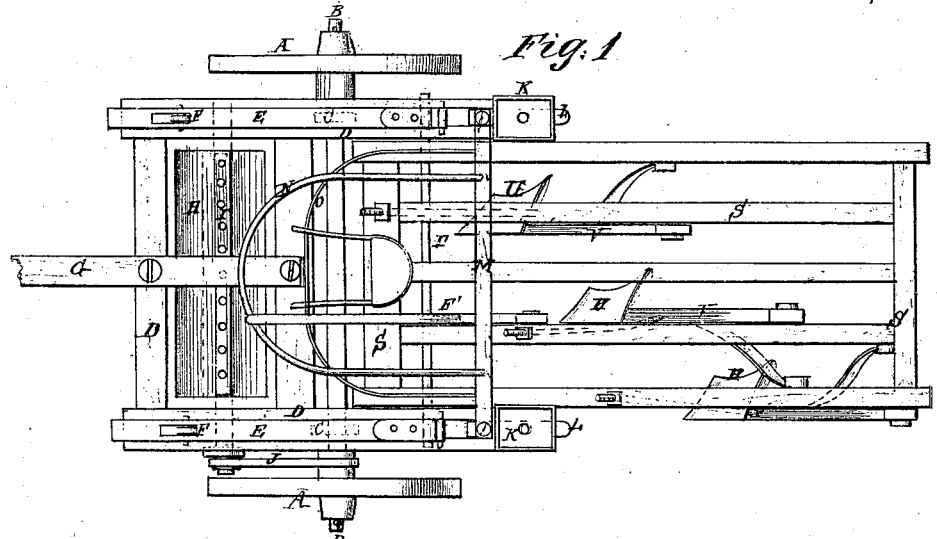
Figure 2:
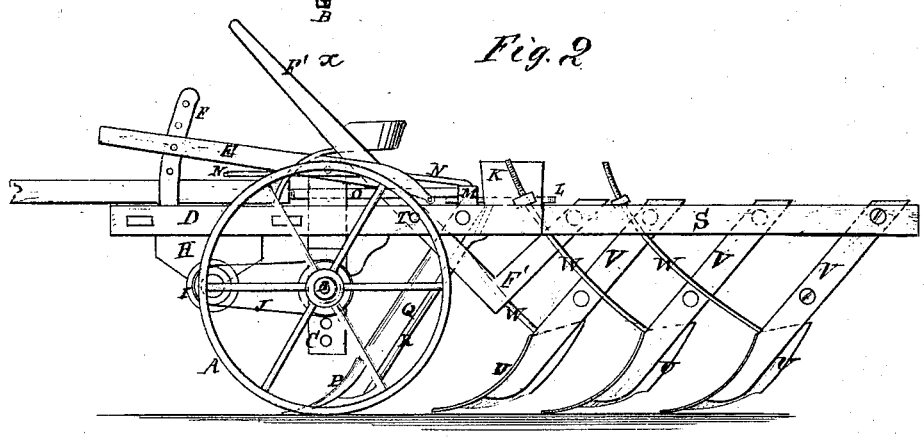
Figure 3:
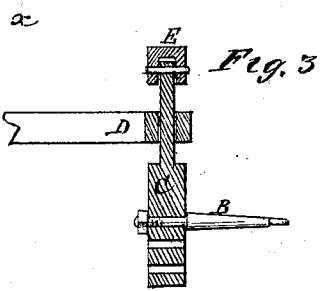
Figure 4:
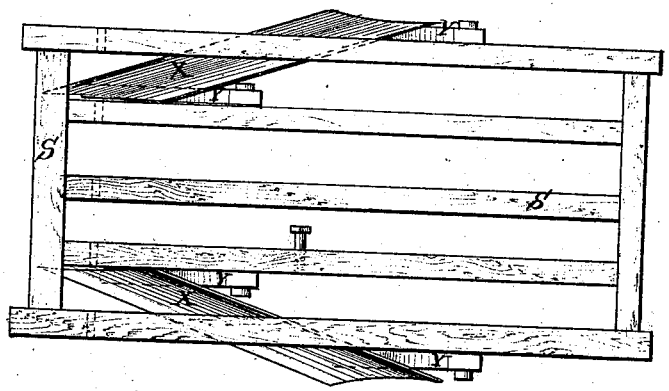
Figure 5:
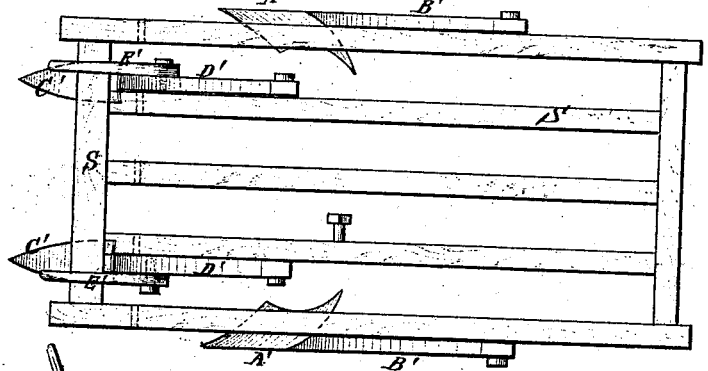
Figure 6:
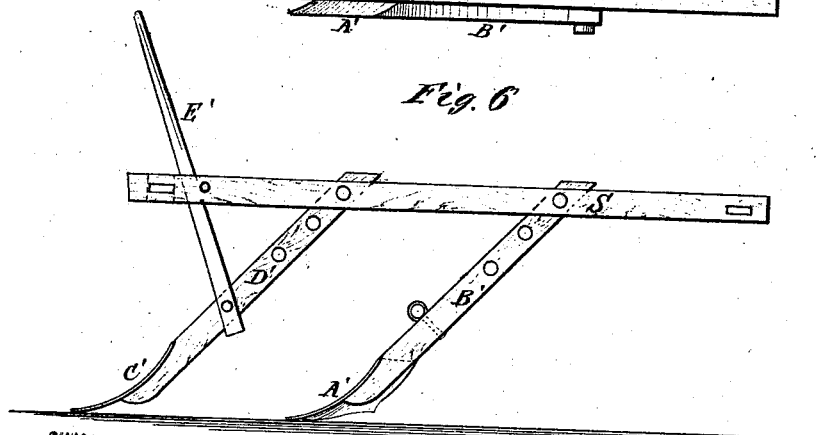

Figure 1, Sheet I, is a top view of my improved machine, arranged as a gang-plow, and showing the seed-sowing and seed-dropping devices. Fig. 2, Sheet I, is a side view of the same. Fig. 3, Sheet I, is a detail sectional view taken through the line $x\,x$, Fig. 2. Fig. 4, Sheet II, is a top view of the rear or pivoted frame, arranged as a cotton-scraper. Fig. 5, Sheet II, is a top view of the same, arranged as a cultivator. Fig. 6, Sheet II, is a side view of the arrangement shown in Fig. 5.

Similar letters of reference indicate corresponding parts.

My invention has for its object to furnish a strong, simple, durable, and effective machine, which shall be so constructed and arranged that it may be readily adjusted for use as a gang-plow, seed-sower, seed-planter, cultivator, and cotton-scrape, and which will do its work thoroughly and well in either capacity; and it consists in the construction and combination of various parts of the machine, as hereinafter more fully described.

A are the wheels, which revolve upon journals or spindles B, the inner ends of which are adjustably attached to the lower parts of the uprights C, several holes being formed in the lower parts of the said uprights for the reception of the said journals, so as to raise and lower the said wheels as may be required. The upper parts of the uprights C pass up through mortises in the side bars of the frame D, and their upper ends are pivoted to the levers E, as shown in Figs. 1, 2, and 3. The rear ends of the levers E are pivoted or hinged to the rear parts of the side bars of the frame D, and their forward ends are mortised, to receive the curved arms F, attached to the forward ends of the said side bars of the said frames D. The curved arms F have several holes formed through them, to receive a pin to support the said levers E in any position into which they may be adjusted.

G is the tongue, which is rigidly attached to forward part of the frame D.

H is a long trough or box, which extends across the forward part of the frame D, and is detachably secured to said frame by hooks or other suitable means. The bottom of the box or trough H is made V-shaped, and has a longitudinal slot or opening formed through its center, as shown in Figs. 1 and 2.

I is a roller extending along the bottom of the box or trough H, directly beneath the slot or opening in the bottom of said box or trough. The roller I has small cavities or recesses formed in it, which receive the seed from the said trough or box and allow it to drop to the ground as the said roller revolves. The roller I revolves in bearings attached to the ends of the box or trough H, and is driven by a band, J, which passes around the hub of one of the wheels A, and around a pulley attached to or formed upon the end of the rollers I, as shown in Figs. 1 and 2. The parts H I J form the seed-sowing device, and the seed sown by it is covered by a series or gang of plows attached to a rear frame of the machine, as hereinafter described.

K are the hoppers for the corn or other seeds that are to be dropped in hills, and which are attached to the rear ends of the side bars of the frame D.

L are slides that slide back and forth in recesses or grooves beneath the bottoms of the hoppers K, and which have holes formed in them of such a size as to contain enough seed to form a hill. As the slides L are pushed back, the hole in them comes beneath a hole in the bottoms of the hoppers, and, as the said slides are drawn forward, the seed drops into the upper ends of the conductor-spouts by which it is conducted to the ground. To the forward ends of the slides L are attached the ends of the cross-bar M, so that both the slides may be operated at the same time and by the same operation.

N is a curved bar the ends of which are attached to the cross-bar M, and which extends forward into such a position that the driver, by pressing against it with his feet, may draw the slides L forward to drop the seed. The slides L are forced back to receive another supply of seed by the spring O, the ends of which are attached to the cross-bar M, and which rests against the uprights that support the seat, or against some other suitable support attached to the frame D.

P are the plows that open the furrows to receive the seed, and the upper ends of the standards Q of which are detachably attached to the rear parts of the side bars of the frame D, a little in front of the hoppers K.

R are the spouts that receive the seed from the slides L and conduct it to the ground, and which are secured to the rear sides of the standards Q, so as to discharge the seed into the bottom of the furrows, close in the rear of the plows P. When the machine is not being used as a planter, the plow-standards Q and their attached plows P and conductor-spouts R may be detached and laid aside.

S is a rectangular frame formed by attaching five longitudinal bars to two cross or end bars, as shown in Figs. 1, 4, and 5. The forward end of the frame S is pivoted to and between the rear ends of the side bars of the frame D by a rod, T, as shown in Figs. 1 and 2.

U are turn or breaking plows, the upper ends of the standards V of which are detachably attached to the longitudinal bars of the frame S, each succeeding standard being at a sufficient distance in the rear of the preceding one, as shown in Figs. 1 and 2, thus forming a gang of plows. The draft-strain upon the standards V is sustained by the brace-bars W, the lower ends of which are secured to the lower parts of the said standards V, the upper ends of which pass up through and are secured to the longitudinal bars of the frame S, as shown in Fig. 2. When the machine is to be used as a cotton-scraper, the gang-plows U V W are detached and replaced by the cotton-scrapers X Y.

X are the scraper-plates, each of which is attached to the lower ends of two standards, V. The upper ends of the two pairs of standards V are attached to the outer bars of the frame S, the inner one at a suitable distance in advance of the outer one, so as to bring the scrapers X into proper position for scraping both sides of a row of plants at the same time, as shown in Fig. 4.

A' are the outer cultivator-plows, the standards B' of which are adjustably attached to the outer longitudinal bars of the frame S, so that they may be raised or lowered to adjust them for working shallower or deeper in the ground, as may be required.

C' are the inner cultivator-plows, the upper ends of the standards D' of which are adjustably attached to the second longitudinal bars upon each side, as shown in Figs. 5 and 6, so that they may be raised or lowered to adjust them for working shallower or deeper in the ground, as may be desired.

E' are levers the lower ends of which are attached to the standards D', and the upper ends of which pass up into such a position that they may be conveniently reached and operated by the driver from his seat, to guide the inner cultivator-plows, as may be required in cultivating the row of plants.

F' is a bent or elbow lever, the end of the short arm of which is pivoted to one of the longitudinal bars of the frame S. The lever F' is pivoted to the rod T, that pivots the frame S to the frame D, which rod thus forms the fulcrum of the said lever. The upper end of the lever F' extends up into such a position that it may be conveniently reached and operated by the driver from his seat, to raise the frame S, and with it its attached standards and plows, away from the ground, when required.

Having thus described my invention, I claim as new and desire to secure by Letters Patent—

1. The combination of the seed-box H, recessed roller I, and band J, with the wheels A, spindles B, uprights C, levers E, frame D, and pivoted frame S, to which the plows are attached, substantially as herein shown and described, and for the purpose set forth.

2. The combination of the hoppers K, dropping-slides L, cross-bar M, bow or bent bar N, springs O, plow-standards Q, and conductor-spouts R, with each other and with the frame D, levers E, uprights C, spindles B, and wheels A, substantially as herein shown and described, and for the purpose set forth.

3. The combination of the turn or breaking plows U V W and lever F' with the pivoted frame S, frame D, levers E, uprights C, spindles B, and wheels A, substantially as herein shown and described, and for the purpose set forth.

4. The combination of the outer cultivator-plows, A' B', inner cultivater-plows, C' D', and lever E', with the pivoted frame S, lever F', frame D, levers E, uprights C, spindles B, and wheels A, substantially as herein shown and described, and for the purpose set forth.

The above specification of my invention signed by me.

J. P. EDDLEMAN.

Witnesses:
R. W. EDDLEMAN,
A. W. COOKE.